US012054976B2

(12) United States Patent
Liermann et al.

(10) Patent No.: US 12,054,976 B2
(45) Date of Patent: Aug. 6, 2024

(54) FIRE-RESISTANT CONCEALED DOOR HINGE

(71) Applicants: Nicolas Liermann, Rheda-Wiedenbrueck (DE); Joerg Ellefred, Rheda-Wiedenbrueck (DE)

(72) Inventors: Nicolas Liermann, Rheda-Wiedenbrueck (DE); Joerg Ellefred, Rheda-Wiedenbrueck (DE)

(73) Assignee: SIMONSWERK GMBH, Rheda-Wiedenbrueck (DE)

( * ) Notice: Subject to any disclaimer, the term of this patent is extended or adjusted under 35 U.S.C. 154(b) by 0 days.

(21) Appl. No.: 17/971,192

(22) Filed: Oct. 21, 2022

(65) Prior Publication Data

US 2023/0151658 A1 May 18, 2023

(30) Foreign Application Priority Data

Nov. 16, 2021 (DE) ......................... 102021129869.5

(51) Int. Cl.

*E05D 11/00* (2006.01)
*E05D 3/06* (2006.01)
*E05D 7/00* (2006.01)

(52) U.S. Cl.

CPC ................. *E05D 7/00* (2013.01); *E05D 3/06* (2013.01); *E05Y 2600/41* (2013.01); *E05Y 2900/132* (2013.01)

(58) Field of Classification Search

CPC . E06B 5/16; E06B 5/164; E06B 5/167; E05Y 2900/134; E05Y 2600/41; E05Y 2600/45; E05Y 2900/132; E05D 7/00; E05D 3/06

See application file for complete search history.

(56) References Cited

U.S. PATENT DOCUMENTS

| | | | | | |
|---|---|---|---|---|---|
| 3,001,224 | A * | 9/1961 | Soss | E05D 3/16 | 16/379 |
| 3,566,541 | A * | 3/1971 | Coulter | E06B 7/2316 | 49/467 |
| 5,172,452 | A * | 12/1992 | Brown | A62C 2/065 | 16/385 |
| 5,492,208 | A * | 2/1996 | Goossens | E06B 5/164 | 292/66 |
| 5,685,045 | A * | 11/1997 | Lace | E06B 5/164 | 16/354 |

(Continued)

FOREIGN PATENT DOCUMENTS

| | | | | |
|---|---|---|---|---|
| EP | 3176353 A1 * | 6/2017 | | |
| GB | 1580160 A * | 11/1980 | | E05D 11/00 |

(Continued)

*Primary Examiner* — Chuck Y Mah
(74) *Attorney, Agent, or Firm* — Andrew Wilford

(57) ABSTRACT

A hinge has first and second leaf assemblies pivoted on each other and a link assembly interconnecting the first and second leaf assemblies. At least one of the first and second leaf assemblies has upper and lower mounts forming a cavity in which a respective end of the link assembly is pivoted, and at least one of the mounts of the one leaf assembly is formed with a recess opening into the cavity. According to the invention a body of foaming fire-protection material is provided in the recess so that when heated the body expands and fills the cavity with fire-protective foam.

18 Claims, 2 Drawing Sheets

(56) References Cited

U.S. PATENT DOCUMENTS

| | | | | |
|---|---|---|---|---|
| 6,170,210 | B1 * | 1/2001 | Marts | E06B 5/164<br>52/656.2 |
| 9,822,564 | B2 * | 11/2017 | Dreisewerd | E05D 7/04 |
| 2012/0291225 | A1 * | 11/2012 | Liermann | E05D 3/186<br>16/364 |
| 2017/0089108 | A1 * | 3/2017 | Nikolaus | E05D 3/186 |

FOREIGN PATENT DOCUMENTS

| | | | | | |
|---|---|---|---|---|---|
| GB | 2186794 | A | * | 8/1987 | A62C 2/065 |
| GB | 2275491 | A | * | 8/1994 | E05D 11/0027 |
| GB | 2451276 | A | * | 1/2009 | E05D 3/122 |
| JP | 6978297 | B2 | * | 12/2021 | |
| WO | WO-2006128549 | A1 | * | 12/2006 | E06B 1/52 |

* cited by examiner

FIRE-RESISTANT CONCEALED DOOR HINGE

FIELD OF THE INVENTION

The present invention relates to a door hinge. More particularly this invention concerns a concealed door hinge.

BACKGROUND OF THE INVENTION

A typical concealed door hinge has first and second leaf assemblies and at least one link assembly pivotally interconnecting the leaf assemblies. Normally both of the leaf assemblies have upper and lower mounts forming a cavity in which the link assembly is pivotally mounted.

It is also known from practice to provide flame-retarding fire protection in a door system. Such fire protection concerns on the one hand the door panel that is either made of a heat-resistant material or contains materials that have a self-extinguishing effect and are used for this purpose and that when heated past a certain temperature threshold release cooling materials such as water, to prevent the passage of fire for a longer period of time. Particularly well known in this connection is gypsum that, for example, is used as the core of the door panel.

In addition, it is of particular interest to also prevent the passage of gases past the hinged side of the door. These gases can be atmospheric oxygen or flue gases or even smoke. While the entry of oxygen would feed the fire, the leakage of flue gas could make an escape route unavailable. With this in mind, it is known to provide fire-protection strips along the edges of the door panel or along the stop of the door frame so that, in the event of a fire, the strips expand, foam, or intumesce and thereby seal the gap between the door panel and the frame. In the course of the foaming process, a so-called foaming which is usually in the range of 1.0 to 1.5 N/mm$^2$ closes the gap.

In addition to an effective seal between the door panel and the frame it is important that in the event of a fire the door panel be mechanically held as close as possible to the frame for as long a period as possible.

For example, nowadays a large number of hinges are made from die-cast zinc that is easily made into the hinge parts but whose melting point of 650° C. can easily be exceeded in a fire. As a result, the die-cast parts soften or melt, so that the required mechanical stability mechanical stability can no longer be ensured.

Due to the large number of components and in particular the pivoting design, the hinge also forms a large number of gaps allowing the passage of gas. In view of this, it is therefore of interest to provide fire-retardant measures for the hinge as well.

OBJECTS OF THE INVENTION

It is therefore an object of the present invention to provide an improved hinge.

Another object is the provision of such an improved hinge that overcomes the above-given disadvantages, in particular that offers a degree of fire prevention by preventing the passage of hot gases through the hinge in the event of a fire on one side of the door and that also insulates the parts of the hinge to prevent their softening or melting.

A further object is to provide a recessed hinge with special fire-prevention features.

SUMMARY OF THE INVENTION

A hinge has according to the invention first and second leaf assemblies pivoted on each other and a link assembly interconnecting the first and second leaf assemblies. At least one of the first and second leaf assemblies has upper and lower mounts forming a cavity in which a respective end of the link assembly is pivoted, and at least one of the mounts of the one leaf assembly is formed with a recess opening into the cavity. According to the invention a body of foaming fire-protection material is provided in the recess so that when heated the body expands and fills the cavity with fire-protective foam.

In this connection, the invention is based on the realization that the elements are usually formed in the leaf assemblies in such a way that the addition of a recess is possible and even relatively easy. This recess is then used to hold a fire-protection body that time secured in the recess such that the link assembly can be easily positioned over to pass over the recess and the fire-protection material therein.

At the same time, the recess of this invention can hold a sufficient quantity of the material that, when it is heated and expands as foam, it fills all the spaces in the cavity around the link assembly. The spaces are sealed tightly, which on the one hand prevents the passage of gases and at the same time holds the links in place even in the event of partial melting or softening of parts of the hinge, to hold the door panel in place for as long a period as possible. In combination with fire-protection bodies between the door panel and the frame, it is possible to create a hinge that can withstand fire from heat on one side and at the same time allow access to escape routes.

Such a design is particularly advantageous if the door panel is also made of a fire-retardant material. But even in the case of wood, a higher fire-protection class can be achieved in this way. It should be noted that the fire classification is not based on individual components but rather on the overall system. The longer the period during which the hinge withstands the fire, the higher the fire rating. Thus, components can contribute to a higher fire classification. Due to the improved fire resistance of the hinge, a higher fire classification of the entire door system is also possible The recess can basically be designed in various ways. For example, the surface of the housing for the leaf assembly or the surface of the corresponding mounting element facing the link assembly are formed with ribs that in turn form a lateral boundary for the fire-protection body. The provision of such ribs is particularly advantageous if the mounts are essentially formed from sheet metal and thus have a correspondingly low wall thickness.

Alternatively, according to a preferred embodiment, however, it is envisaged that recess is a pocket. In the context of the invention a pocket is provided in the mount opening at a surface thereof facing the link assembly. It is particularly useful if the mount is not of sheet metal but is for example die cast, e.g. die-cast zinc. This material can even be spared by the pocket.

The depth of this pocket is based in particular on the available total thickness of the mount and is according to a preferred embodiment is between 2 and 10 mm, preferably between 3 and 8 mm. The base area of the pocket can be between 20 and 80%, preferably between 30 and 70%, particularly preferably between 40 and 60% of the surface of the respective mount, that is a projected surface of the mount without the inclusion of cutouts or holes in the mount. In addition it goes without saying that it is within the scope of the invention that different mounts also have differently sized pockets.

In contrast to the design with ribs, such a design has the advantage that the mounts have a substantially smooth surface, and movement of the hinges can be carried out in a simple manner to avoid grinding of the surface of the mount.

According to a preferred further development of the invention the fire-protection body is in a nonfoamed state flush with a surface of the mount adjacent the pocket. It is understood that the adjacent surface is the surface of the mount surrounding the pocket or cavity. This arrangement ensures that the space available for the pocket is used in the best possible way, while at the same time the flush design ensures that the links can slide along the surface of the pocket without stress. Since such designs are usually subject to a certain manufacturing tolerance, in the context of the invention "flush" means at least a tolerance of +/−5% with respect to the height of the pocket, while still being considered to be flush.

Although it is sufficient in the context of the invention, if only one of the mounts is formed with such a recess or pocket provided with a fire-protection body, according to a preferred embodiment of the invention the upper and the lower mount and a fire-protection body are both provided with such pockets holding respective fire-protection bodies.

In the event of a fire, all the fire-protection bodies foam and stabilize the hinges to fill all gaps so as to stabilize the hinges, and basically shield the parts of the hinge. At the same time, the multiple arrangement of fire-protection bodies can ensure complete filling of all the empty spaces within the hinge much more easily than with a design in which only a single mounts is provided with a pocket and a fire-protection body therein.

In particular, all common materials known in practice can be used as fire-protection bodies. It is preferably provided that the fire-protection element in the pocket starts foaming or intumescing at a temperature of more than 130° C., particularly preferably at a temperature of more than 150° C.

Preferably, the hinge is formed at least in part from die-cast zinc. This applies in particular to the housings of the leaf assemblies in which the mounts are then preferably installed as separate components. Of course, it is also within the scope of the invention that the mounts are formed integrally with the respective housings, whereas in the case of a separate manufacture of the mounts, they can also be manufactured as a zinc die casting.

As already explained above, the particular advantage of zinc die castings is that complex shapes can easily be made in a simple manner, so that a wide variety can be made. However, such zinc die castings have a low melting point compared to stainless steel or aluminum components, so that they can only be described as heat-resistant to a limited extent. In combination with the fire-protection bodies according to the invention, it is nevertheless possible to create such a die-cast part that, on the one hand, has a high-quality visual appearance and high functionality on the one hand, and at the same time is of increased fire resistance, because the fire-protection bodies retard melting of the hinge parts to increase mechanical stability and provide a sufficient gas seal.

This advantage is particularly effective in the case of hinges that are concealed between the trim and the frame. In this case, the leaf assemblies are inserted in mortises in the edge of the door panel and in the reveal area of the door frame.

In accordance with such an embodiment, it can be provided that at least a first and a second link are provided, pivotally connected to each other at a vertical axis of rotation. Furthermore, the first link can be inserted in the upper and lower mount of the first leaf assembly. This also applies to the second link in the second leaf assembly. Such a design then usually provides for mounts in both leaf assemblies, and it is sufficient in principle if only the mounts of one leaf assembly are provided with pockets and fire-protection bodies. Preferably the upper and lower elements of both leaf assemblies have a corresponding shape, so that at least four fire-protection bodies are then provided in the hinge. The design of the pocket can differ between the leaf assemblies.

Starting from a design for a concealed mounting of the hinge, the links are in the closed-door position contained in the cavities of the leaf assemblies and are therefore not visible from the outside. Such an arrangement can be achieved by different kinematics, although preferably the first link is preferably slidably mounted in the upper and the lower mounts of the first leaf assembly. For this purpose the first link is mounted for displacement in the upper and lower mount of the first leaf assembly, and the slide is displaceable in groove of the mounts connected to the first link by a first pivot.

In the second leaf assembly there is then a purely pivotal mounting of the first link. The second link can be mounted in the leaf assemblies basically analogously to the first joint, in which case it can be slidable and pivotal in the second leaf assembly. According to a preferred embodiment, however the second link consists of two link elements that are pivoted to each other so that the first link element is in the first leaf assembly and the second link element is pivoted in the second leaf assembly and not longitudinally displaceable.

According to a further development of the invention the mounts are at least partially detachably mounted in one of the leaf assemblies. This makes it possible in particular to fix the link assemblies first to the mounting elements, and then the mounts are installed with the link assemblies in the housings of the leaf assemblies. At the same time, the mounting elements or the connection between the mounting elements and the base body can also be provided on the mounting elements or on the connection between the leaf assemblies in different spatial directions relative to one another. Even with such an adjustable design the provision of the fire-protection bodies in the cavities is of particular advantage, since even in the case of an adjustment there is no relative movement between the fire-protection bodies and the links and thus movement of the links is not impaired.

In accordance with a further development of the invention, the hinge has the feature that, starting from a closed position, an opening angle is possible of at least 135°, preferably of at least 160° until a maximum opening position of 180° is reached.

In addition, it is preferably provided that, during an opening movement from the closed position to the open position, the link assembly pivots relative to the first leaf assembly in a first direction of rotation and the second leaf assembly likewise pivots in this first direction of rotation.

It is further an object of the invention to provide a door system with a door panel, a door frame and a hinge according to the invention, where the door panel is pivotal on the frame by means of the hinge and the first leaf assembly is set in a mortise on an edge of the door panel and the second leaf assembly in a mortise on the door frame.

Preferably, the door frame has a stop strip against which the door panel rests in a closed position and there is, on a side of the stop facing the door panel, a fire-protection strip extending in the vertical direction and consisting of a material that expands when heated. The fire-protection strip may be the same material as that used for the material which is also provided for the fire-protection body inside the hinge. In the event of a fire, both the material in the hinge and the material in the gap at the stop foam and seal any gaps between the door panel and the frame, preventing in particular the passage of flue gas and/or atmospheric oxygen through the hinge. In addition, the foaming material on the stop also contributes to a mechanical stabilization of the door panel in the frame.

Although in principle different materials are used for both the door panel and the frame, depending on the desired visual appearance or fire resistance, the door panel and/or the door frame are at least partly made of wood Furthermore, according to a particularly preferred embodiment, two identically formed hinges are mounted one above the other in the vertical direction between the door panel and the door frame. If a particularly heavy door panel is involved, it may also be useful to have more than one hinge, and have two or three hinges as the weight is thus more evenly distributed to the trim frame.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
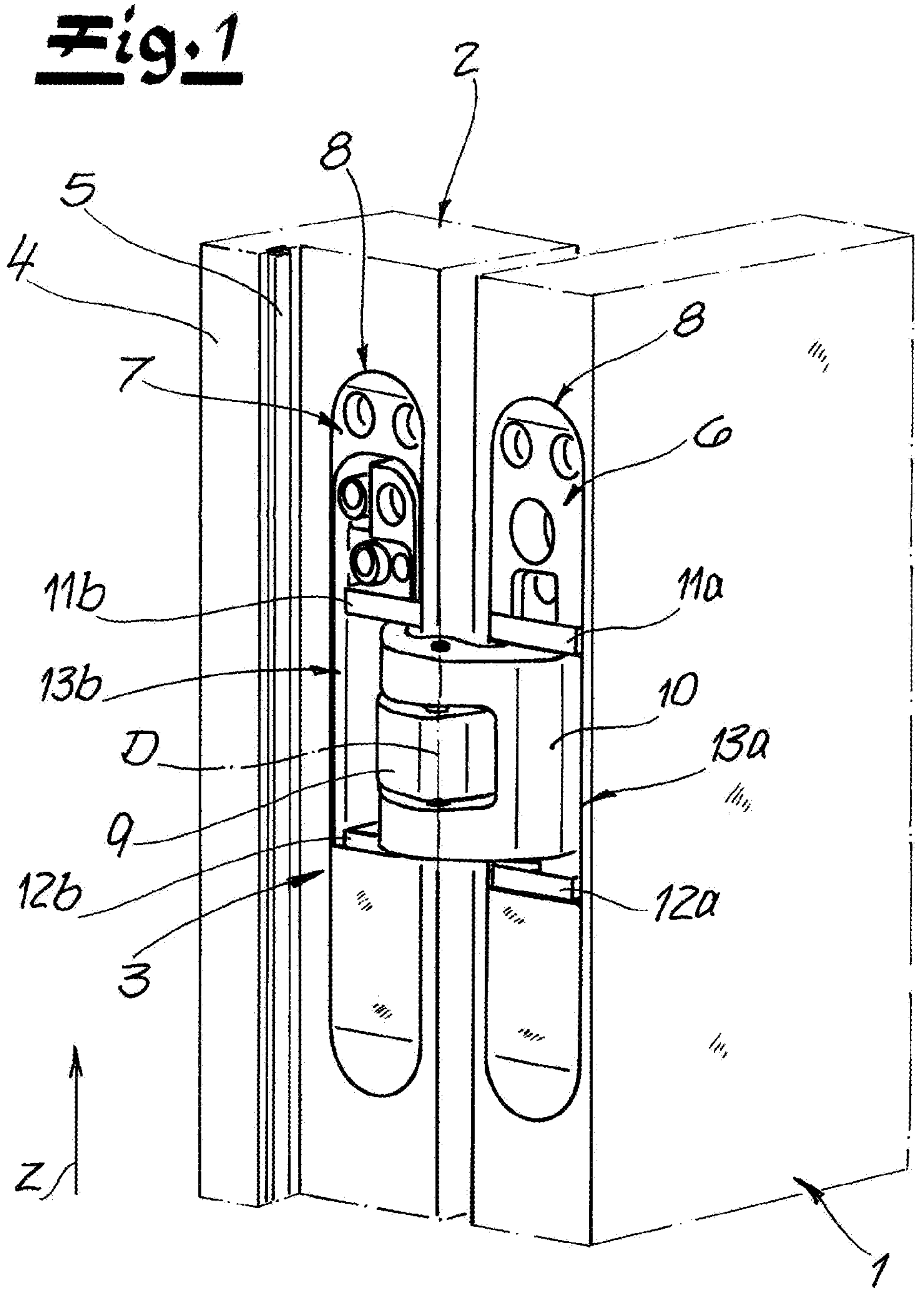
FIG. 1 shows the hinge of this invention when installed and in the full-open position.

FIG. 1 shows a door panel 1, a frame 2, and a hinge 3 that pivotally supports the door panel 1 in the frame 2. The frame 2 also has a stop 4 that extends in a vertical direction Z and that is engaged by the panel 1 in a closed position of the door. The stop 4 carries a fire-protection strip 5 that extends in the vertical direction Z and is thus located in a space between the stop 4 and the door panel 2 in a closed state. The fire-protection strip 5 is made of a material that expands when heated, so that when heated the strip 5 foams up and fills the gap between the stop the stop 4 and the door panel 1.

Figure 2:
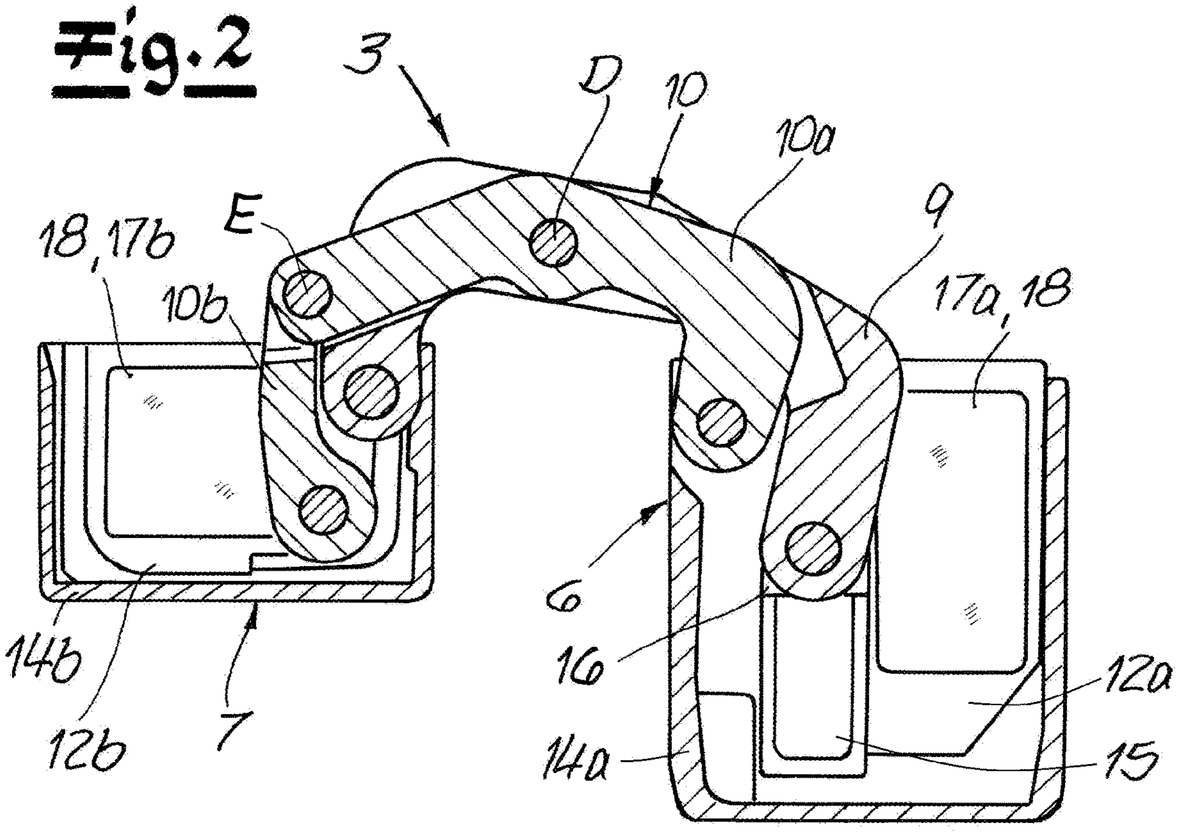
FIG. 2 is a section through the hinge of the sectional view.

The hinge 3 has a first leaf assembly 6 and a second leaf assembly 7 that fit in respective mortises 8 in the edge of the door panel 1 and in the frame 2. In addition, the hinge 3 has a first link 9 and a second link 10 connected together for pivoting about a vertical axis D and forming a link assembly. This connection can be seen in particular in FIG. 2. The second link 10 consists of a first link element 10*a* and a second link element 10*b* that are also pivotally connected to each other for relative rotation about a vertical axis E.

The first leaf assembly 6 and the second leaf assembly 7 have respective upper and lower mounts 11*a* and 11*b* and lower mounts 12*a* and 12*b*. The upper mounts 11*a* and 12*a* together form a first pocket 13*a* in the first leaf assembly 6 and the upper mounts 11*b* and 12*b* define a second cavity 13*b* in the second leaf assembly 7 in which the link elements 9, 10 fit in the closed position.

The mounts 11*a*, 11*b*, 12*a*, and 12*b* are provided in particular for pivotally supporting the link elements 9 and 10 on the respective leaf assemblies 6 and 7. For this purpose the mounts 11*a*, 12*a* of the first leaf assembly 6 and the mounts 11*b*, 12*b* of the second leaf assembly 7 are mirror-symmetrical to each other, whereas the individual link elements 9, 10 are mounted differently. This is shown particularly clearly by FIG. 2 that is a cross-section through the hinge 3 of the invention in an isolated top view of the lower mounts 12*a* and 12*b*

From this it is clear that the mounts 12*a* and 12*b* are separate components and attached to respective housings 14*a* and 14*b* of the leaf assemblies 6 and 7. The fastening may further be provided with an adjustment mechanism that allows movement of the second leaf assembly 7 relative to the first leaf assembly 6 and, accordingly, movement of the door panel 2 within the frame 1 in a vertical direction or in a horizontal direction.

The link assemblies 9, 10 are attached to the mounts 11*b*, 12*b* of the second leaf assembly 7 so that they can pivot only, while the elements 11*a* and 12*a* of the first leaf assembly 6 each have a longitudinal groove 15 provide for longitudinal displacement of a slide 16 the first link assembly 9. The slides 16 thus can move in the respective grooves 16, and the first link element 9 can pivot in the respective slides 16.

Since the groove 15 requires that the respective mounts 11*a* and 12*a* have a certain vertical thickness, it is also possible to provide in each of them a further respective pocket 17*a* or 17*b*. A corresponding pocket 17*a* or 17*b* is also provided in each of the upper mounts 11*a* and 11*b*.

Figure 3A:
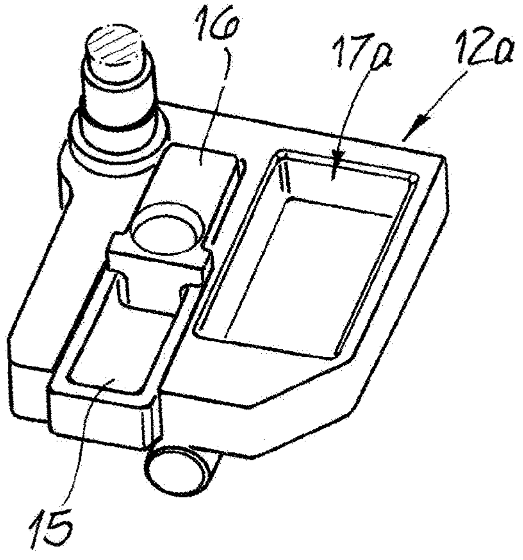
FIGS. 3A and 3B are views of mounts of the hinge of the invention with and without fire-protection body.
Figure 3B:
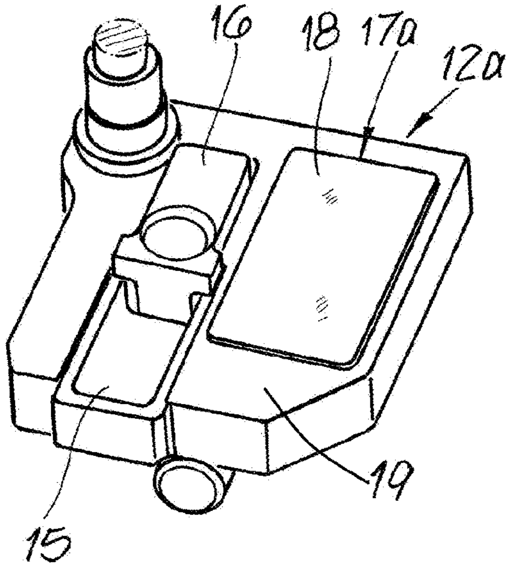

FIGS. 3*a* and 3*b* show by way of example the lower element 12*a* of the first leaf assembly 6 with the respective groove 15 and slide 16 as well as the respective pocket 17*a*. In accordance with the invention, the pocket 17*a* serves to hold a fire-protection body 18 made of a material that expands when heated. This element 18 is recessed in the respective element 11*a*, 11*b*, 12*a*, and/or 12*b* so it is flush with or does not project outward past the planar surface 19 (FIG. 2) of the respective mount 11*a*, 11*b*, 12*a*, and/or 12*b* of the respective housing 14*a* or 14*b*.

Each of the pockets 17*a* and 17*b* is designed in such a way that it opens into the respective cavity 13*a* or 13*b* so that, in the event of a fire, the respective fire-protection body 18 foams up from the pockets 17*a* or 17*b* into the cavities 13*a* and 13*b* and fills them. This ensures that the mechanical stability of the parts of the individual leaf assemblies 6, 7, which are made of die-cast zinc, can be retained as long as possible, so that, along with the fire-protection strip 5, there is adequate sealing and the hinge 3 holds the door panel 1 in the frame 2 for a long period of time. The fire-protection strip 5 and the fire-protection body 18 are usually made of a material that starts to foam at a temperature of approximately 130° C., so that the desired effect can occur at an early stage.

We claim:

1. A hinge comprising:

first and second leaf assemblies pivoted on each other;

a link assembly interconnecting the first and second leaf assemblies, one of the first and second leaf assemblies having upper and lower mounts forming a cavity in which a respective end of the link assembly is pivoted, at least one of the mounts of the one leaf assembly being formed with a recess opening into the cavity; and a body of foaming fire-protection material in the recess and that expands and fills the cavity with fire-protective foam when heated.

2. The hinge according to claim 1, wherein the recess is a pocket.

3. The hinge according to claim 2, wherein the body is flush with a surface of the one mount.

4. The hinge according to claim 1, wherein both of the mounts of the one leaf assembly are formed with a respective such recess holding a respective such body of foam-protection material.

5. The hinge according to claim 1, wherein the material foams at a temperature above 130° C.

6. The hinge according to claim 1, wherein the leaf assemblies are at least partially die cast.

7. The hinge according to claim 1, wherein one of the leaf assemblies is set in an edge of a door and the other of the leaf assemblies is set in a door frame.

8. The hinge according to claim 1, wherein the link assembly is formed by a first and second links that are pivoted to each other.

9. The hinge according to claim 8, wherein the first link is pivoted in the mounts of the first leaf assembly.

10. The hinge according to claim 1, wherein the first and second leaf assemblies each include respective first and second housings in which ends of the link assemblies are pivoted.

11. The hinge according to claim 1, wherein, in a closed position of the hinge, the link assembly is contained in the cavity.

12. The combination of:

a door panel having an edge;

a frame surrounding the door in a closed position; and a hinge according to claim 1 with one of the leaf assemblies set in the edge of the door panel and the other of the leaf assemblies set in the frame.

13. The defined in claim 12, wherein the frame has a stop against which the door panel bears in the closed position, the combination further comprising:

a strip of fire-protection material extending along the stop and compressed between the door panel and the stop in the closed position of the door.

14. The defined in claim 12, wherein the door panel or the frame is at least partially formed of wood.

15. The defined in claim 13, wherein there are two such hinges according to claim 1 spaced one above the other and pivotally suspending the door in the frame.

16. A hinge for a door set in a jamb and pivotal therein between open and closed positions, the hinge comprising:

first and second housings mountable respectively in the jamb and an edge of the door and each forming a cavity, the cavities being closely juxtaposed and confronting each other in the closed position of the door, at least one of the cavities being formed with a recess opening into the respective cavity;

upper and lower first and second mounts in each of the cavities;

a link assembly having first and second ends pivoted in the upper and lower first and second mounts and constructed to support the door when moving between the open and closed positions, the link assembly being contained in the cavities in the closed position of the door; and a body of foaming fire-protection material in the recess constituted of a material that expands and fills the cavities with fire-protective foam when heated.

17. The hinge according to claim 16, wherein each housing is formed with a respective such recess opening into each of the cavities and holding a respective such body of the fire-protection material.

18. The hinge according to claim 16, wherein the link assembly is two pivoted together first and second links having respective first ends pivoted in the first mounts and second ends pivoted in the second mounts.

* * * * *